(12) United States Patent
Dinh

(10) Patent No.: US 7,361,833 B2
(45) Date of Patent: Apr. 22, 2008

(54) PAN TYPE CEILING BOX

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/708,114

(22) Filed: Feb. 16, 2007

(65) Prior Publication Data

US 2007/0205011 A1  Sep. 6, 2007

Related U.S. Application Data

(60) Provisional application No. 60/778,779, filed on Mar. 3, 2006.

(51) Int. Cl.
  *H02G 3/08* (2006.01)

(52) U.S. Cl. .................... 174/58; 174/57; 174/61; 174/63; 248/343

(58) Field of Classification Search .......... 174/58, 174/57, 61, 63, 54; 248/343; 220/3.3, 3.9, 220/3.92, 3.54
See application file for complete search history.

(56) References Cited

U.S. PATENT DOCUMENTS

| 1,751,262 A | 3/1930 | Brown |
| 1,819,460 A | 8/1931 | Frank |
| 2,264,666 A | 12/1941 | Hexdall |
| 2,423,757 A | 7/1947 | Dedge |
| 2,973,175 A | 2/1961 | Appleton |
| 3,097,821 A | 7/1963 | Richards |
| 3,536,281 A | 10/1970 | Meehan et al. |
| 3,616,096 A | 10/1971 | Roeder |
| 3,701,448 A | 10/1972 | Vadnais |
| 4,140,293 A | 2/1979 | Hansen |
| 4,275,862 A | 6/1981 | Takagi et al. |
| 4,463,923 A | 8/1984 | Reiker |
| D288,289 S | 2/1987 | Reiker |
| 4,684,092 A | 8/1987 | Reiker |
| 4,747,506 A | 5/1988 | Stuchlik, III |
| 4,787,587 A | 11/1988 | Deming |

(Continued)

FOREIGN PATENT DOCUMENTS

FR  2 436 518  4/1980

(Continued)

OTHER PUBLICATIONS

"Electrical Components, Products and Systems," Technical/Specification Catalog, p. 798 (1994).

*Primary Examiner*—Dhiru R. Patel
(74) *Attorney, Agent, or Firm*—Hoffmann & Baron, LLP

(57) ABSTRACT

A pan-style electrical outlet box used to secure an electrical fixture such as a light or a ceiling fan to a ceiling joist. This shallow box has a generally planar back wall bounded by a perimeter sidewall extending therefrom. Also extending from the back wall but in an opposite direction are a plurality of mounting brackets that form a joist receiving channel therebetween. Each mounting bracket is integrally molded with the box and is also configured with at least one joist engaging device so as to engage the joist and hence temporarily hold the box thereto. This permits the installer to use both hands when subsequently permanently affixing the box to the joist, such as via the fasteners supplied with the box.

14 Claims, 2 Drawing Sheets

U.S. PATENT DOCUMENTS

| | | | |
|---|---|---|---|
| 4,874,905 A | 10/1989 | Schnell et al. | |
| 4,880,128 A | 11/1989 | Jorgensen | |
| RE33,147 E | 1/1990 | Reiker | |
| 5,234,119 A | 8/1993 | Jorgensen et al. | |
| 5,303,894 A * | 4/1994 | Deschamps et al. | 248/343 |
| 5,407,088 A | 4/1995 | Jorgensen et al. | |
| 5,408,045 A | 4/1995 | Jorgensen et al. | |
| 5,484,076 A | 1/1996 | Petrushka | |
| 5,522,577 A | 6/1996 | Roesch | |
| 5,762,223 A * | 6/1998 | Kerr, Jr. | 220/3.9 |
| 5,854,443 A | 12/1998 | Reiker | |
| 5,900,583 A * | 5/1999 | Russo | 174/61 |
| 6,191,362 B1 | 2/2001 | Gretz | |
| 6,207,897 B1 | 3/2001 | Reiker | |
| 6,355,883 B1 | 3/2002 | Gretz | |
| 6,677,523 B1 | 1/2004 | Gretz | |
| 6,875,922 B1 * | 4/2005 | Petak et al. | 174/58 |

FOREIGN PATENT DOCUMENTS

| | | |
|---|---|---|
| GB | 1 309 950 | 9/1970 |

* cited by examiner

PAN TYPE CEILING BOX

CROSS-REFERENCE TO RELATED APPLICATIONS

This application claims the benefit of U.S. Provisional Application No. 60/778,779, filed on Mar. 3, 2006.

FIELD OF THE INVENTION

This invention pertains to a pan type box typically used in association with ceiling joists and more particularly to a pan box having quick attachment features permitting the box to remain temporarily secured to the joist without screws or other separate fasteners prior to the mounting of the electrical fixture to the joist.

BACKGROUND OF THE INVENTION

Pan type boxes, which are used predominately in ceilings, are quite well known in the art. They are often employed when a box of limited depth is required. This occurs mainly when the electrical fixture to be installed (i.e. light, ceiling fan, etc.) is to be mounted directly underneath a ceiling joist. Hence the fixture is generally secured directly to the joist through the box. This is to be contrasted with boxes that can be used alongside a joist or between adjacent joists.

Generally, pan type boxes consist of nothing more than the box itself. They are often round and made of metal and include one or more mounting screw holes in its back wall so that a fixture fastener can pass vertically therethrough into the joist or other ceiling support. Such a box is exemplified by round ceiling fan support box bearing catalog number 56111-CFB as manufactured by The Thomas & Betts Corporation.

A variation on such a box is shown in U.S. Pat. No. 5,854,443. In this variation, two separate mounting brackets are attached to the back wall during box assembly. These mounting brackets extend upward away from the back wall and contain fastener openings therein so that a fastener can pass horizontally through the mounting bracket and into a side of the joist. The '443 patent further necessitates a second set of fasteners that secure the box to the mounting bracket and possibly even a third set of fasteners that secures the electrical fixture to the box. Hence, the load passes from one set to the other via the box and/or mounting bracket. Consequently, multiple sets of fasteners are required to properly secure a load.

Another variation is shown in U.S. Pat. No. 6,207,897. In this patent, again a pair of upright mounting brackets is secured to the back wall via a first set of fasteners during box assembly. These two brackets form a channel for receipt of a joist therein. Upon joist insertion, a second set of horizontally aligned fasteners are driven through openings in the mounting bracket into the side of the joist. Separate fasteners are then employed to secure the electrical fixture to the mounting bracket. In both this patent and the one above, the box assembly is designed so that the fixture load is transmitted via multiple fasteners sets to the mounting brackets and then to the joist itself.

One feature that is common to all such pan-style boxes described above is the material they are made of. They are all metal boxes which means they are rather expensive to manufacture and hence rather costly for a consumer to purchase.

It is thus an object of this invention to provide a pan type box that is considerably less expensive to manufacture and hence more affordable for the user. Another object of this invention is to provide a pan type box that features mounting brackets, but such brackets do not necessitate an additional assembly step as is required for the above described boxes. Still another object of this invention is to provide a pan type box that can be temporarily secured to the ceiling support without the need for a separate fastener prior to the installation of the electrical fixture. Yet another object of this invention is to reduce the number of separate fasteners required, and hence reduce costs, by requiring only fixture fasteners and no other separate set of fasteners to secure the load to the joist. These and other objects and advantages of this invention will become obvious upon further review and investigation.

SUMMARY OF THE INVENTION

This invention pertains to an electrical outlet box configured with a back wall and a perimetric side wall extending in a first direction from the back wall. This back wall and this perimetric side wall define an interior volume. Also extending from this back wall, but in an opposite direction, are at least two mounting brackets. These mounting brackets along with a mid-portion of the back wall define a joist receiving channel or cavity. Configured on these mounting brackets are joist engaging structure which extend into the joist receiving cavity and engage the joist, thereby temporarily retaining the outlet box thereon. The back wall, side wall, mounting brackets and joist engaging structure are all integrally formed and of unitary construction.

The outlet box is preferably non-metallic. The back wall is generally planar and the joist receiving channel and the interior volume extend on opposite sides of the back wall.

The outlet box further preferably includes a screw retention arrangement configured to temporarily secure at least one screw therein. The screw retention arrangement projects into the interior volume and preferably includes a resilient tab and a fixed post integrally formed on the back wall, wherein the tab and post define a screw receiving space therebetween.

In a preferred embodiment, there are two mounting brackets extending from the back wall and joist engaging structure is provided on each mounting bracket. The joist engaging structure is configured with at least one tooth for embedment into a respective side of the joist. More preferably, each mounting bracket is provided with two engagement teeth disposed at opposite longitudinal ends thereof. Each tooth is configured having a joist receiving side, which is sloped to aid in the insertion of the joist into the joist receiving channel. The tooth further includes a joist retention side opposite the joist receiving side, which intersects with the joist receiving side at a sharp point or edge. The joist retention side may extend generally perpendicular to the joist, or it may extend at a downward angle toward the bottom wall of the box. Also, at least a portion of the joist engaging structure may be aligned with indents formed in the perimetric side wall of the box, but such joist engaging structure preferably does not extend beyond the maximum width of the box interior. This is so that the box can be inserted through an existing wall opening in "rework" installations. These indents formed in the side wall of the box also permit access to the joist engaging structure with a tool, as will be discussed in further detail below.

A preferred form of the electrical outlet box assembly, as well as other embodiments, objects, features and advantages of this invention, will be apparent from the following

DETAILED DESCRIPTION OF THE PREFERRED EMBODIMENT

The invention, in its broadest sense, pertains to a new design for a shallow or pan type box 10 which is used to secure an electrical fixture, such as a ceiling fan or a light, to a ceiling support such as a joist. One unique feature of this box 10 is that all its various components are integrally formed or molded. In other words, it is a one-piece unitary box. Once box 10 is formed, nothing further need be attached to the box to complete its assembly other than possibly attaching removable fasteners as described herein prior to shipping.

Box 10 is preferably a non-metallic box and hence is made of plastic or some other non-metallic material common in the electrical arts. Being non-metallic, box 10 can be molded rather than stamped, formed and threaded (if required) and hence is easier and cheaper to manufacture.

Figure 1:
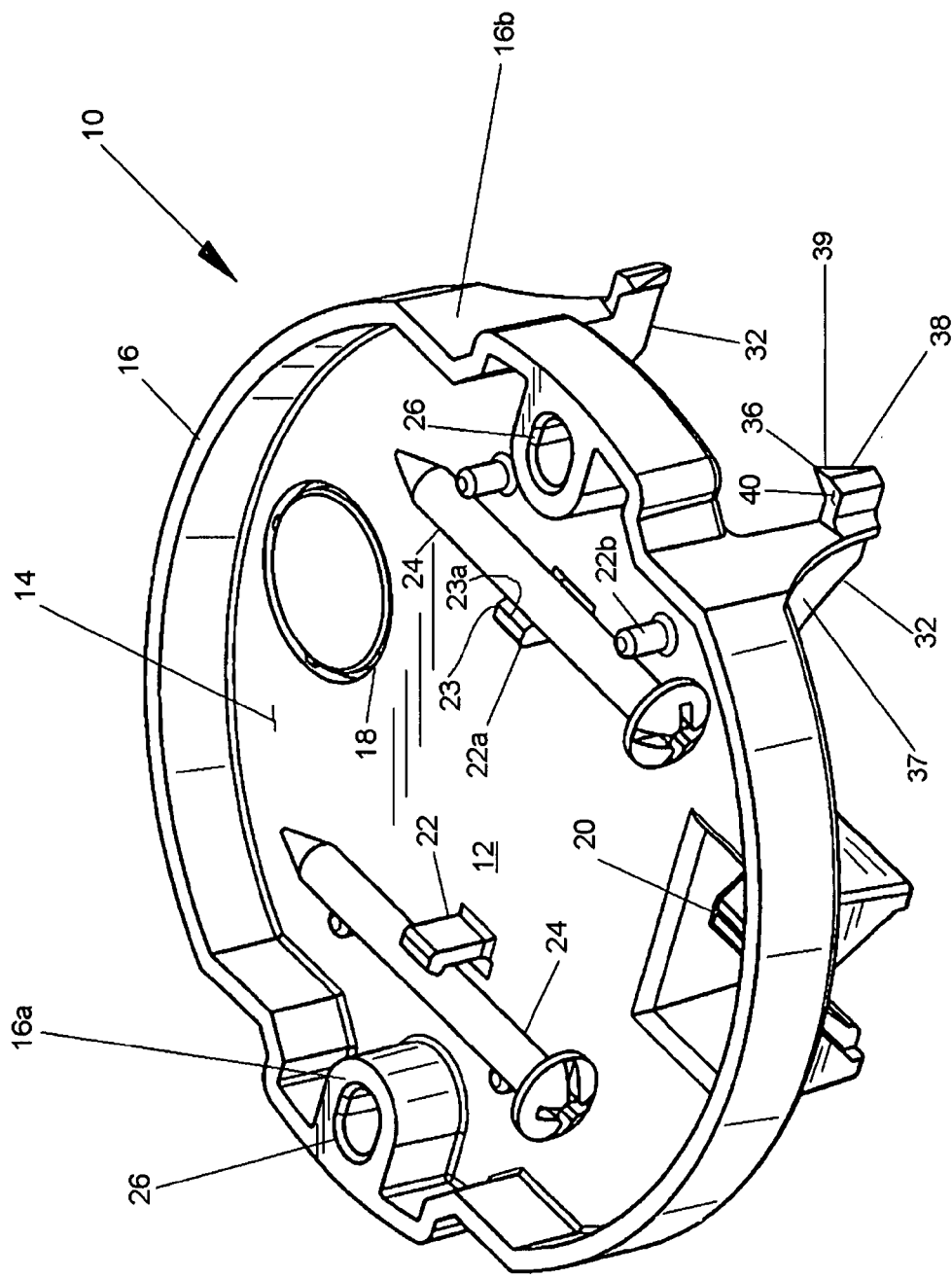
FIG. 1 is a top perspective view of the pan type box formed in accordance with the present invention.
Figure 2:
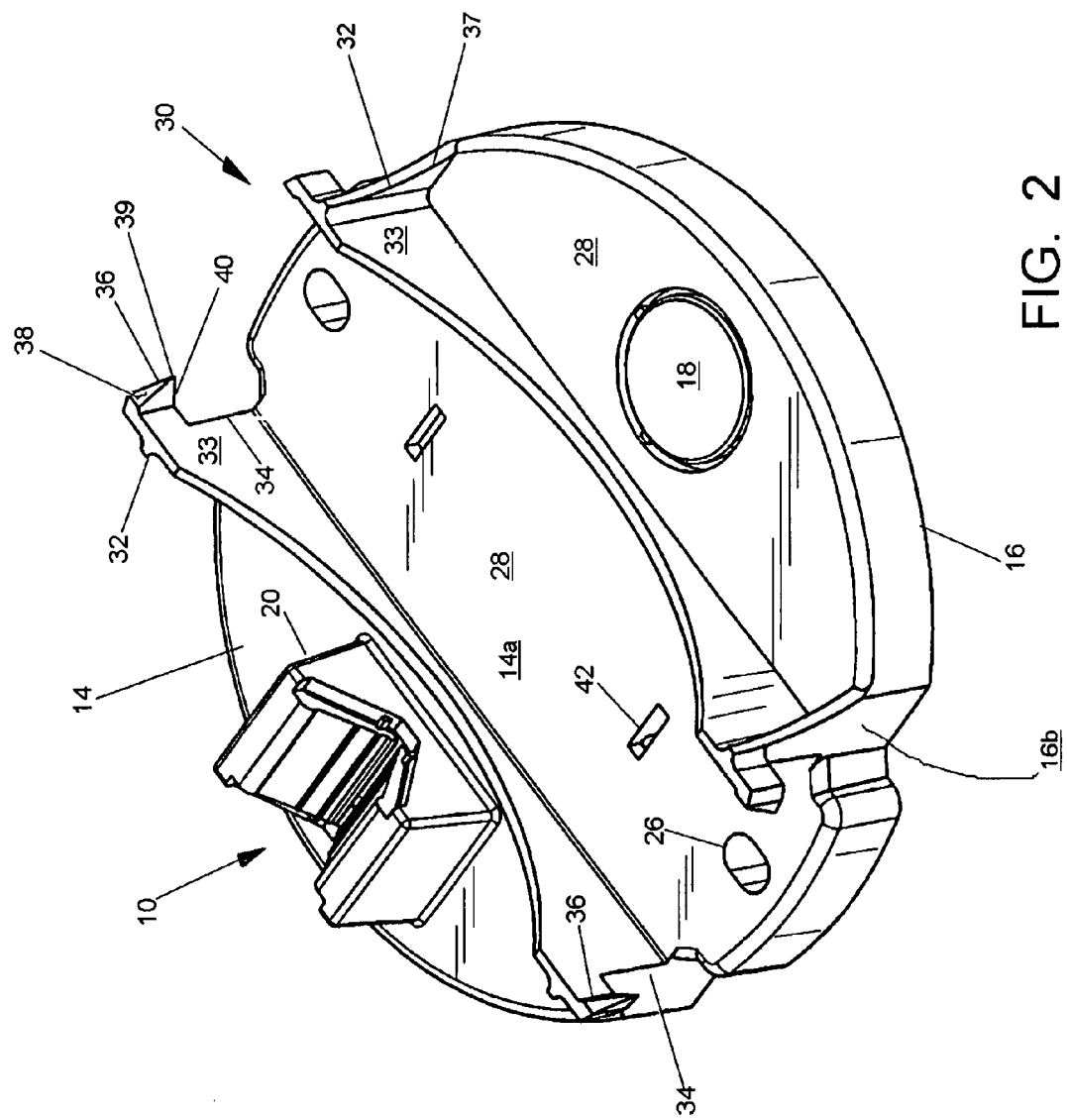
FIG. 2 is a bottom perspective view of the pan type box shown in FIG. 1.

Referring initially to FIG. 1, the interior volume 12 of the box 10 is defined by a planar back wall 14 and a perimetric side wall 16. The box 10 shown in FIGS. 1 and 2 is circular in shape and has a perimetric side wall 16 extending around the circumference of the box. However, the box 10 may take any other shape, such as square, rectangular and octagonal shapes.

Box 10 may contain one or more knockouts 18 as well as one or more cable entry passageways 20, all to be determined by the manufacturer. In the embodiment shown, the interior volume 12 of box 10 is also configured with a series of upright tabs 22 that are designed to temporarily hold a fixture fastener 24. More particularly, and as shown in this embodiment, the upright tabs 22 preferably include at least one resilient tab 22a spaced apart from at least one fixed cylindrical post 22b. The spacing between the resilient tab 22a and the cylindrical post 22b is approximately equal to the diameter of the body of the fixture fastener 24. Further, the resilient tab 22a is slightly flexible to provide a biasing force on the fixture fastener 24 against the more rigid cylindrical post 22b. In the preferred embodiment, shown in FIGS. 1 and 2, there is one resilient tab 22a spaced apart from two fixed cylindrical posts 22b. However, other combinations of fixed and resilient tabs can be utilized in the present invention.

Moreover, the resilient tab 22a preferably includes a lip 23 for retaining the fixture fastener in the space defined between the resilient tab and the fixed post 22b. The lip 23 extends inwardly into the space defined between the resilient tab 22a and the post 22b and further preferably includes a downwardly chamfered surface 23a to facilitate and guide downward insertion of the fixture fastener 24 between the resilient tab 22a and the post 22b.

In a preferred embodiment, there are two sets of upright tabs 22 for retaining two fixture fasteners 24. During installation, these fixture fasteners 24 are easily removed from tabs 22 and inserted into mounting holes 26 prior to being driven directly into a ceiling support such as a joist (not shown). The mounting holes 26 are preferably formed in integral boss portions 16a of the side wall 16 and extend through the box 10 from the interior side to the bottom side 28 of the box. Hence, when installed, fixture fasteners 24 permanently secure both the electrical fixture as well as the box 10 to the joist, without transferring any weight of the fixture through the box.

Referring now to FIG. 2, the bottom side 28 of box 10 is shown. Extending across the bottom side 28 is a joist receiving channel 30 defined by a mid-portion 14a of the bottom side of the back wall 14 and two upstanding mounting brackets 32. The mounting brackets 32 include opposite parallel channel walls 33 that extend upwardly from the back wall 14 of the box 10 so that the channel 30 does not bisect or extend into the interior volume 12. The two channel walls 33 are spaced from each other sufficiently enough to permit a joist to fit therebetween and abut against the mid-portion 14a of the bottom side 28 of the junction box back wall 14.

In the embodiment shown, each mounting bracket 32 is a mirror image of the other and each channel wall 33 extends continuously from one side of the box 10 to the other. In particular, each channel wall 33 preferably begins at one point on the side wall 16 and extends across the back wall 14 to an opposite point on the side wall. Hence joist receiving channel 30 is fully defined therebetween. The channel wall 33 may be arched, as shown, to reduce material cost without diminishing the strength of the bracket 32. Alternate constructions are also likely such as employing four separate uprights in or adjacent to the four corners of channel 30. Further or additional such uprights may be employed in a mid-channel region adjacent either knockout 18 or cable entry passageway 20. The final design of box 10 is dependent upon the manufacturer.

Each longitudinal end 34 of each channel wall 33 is configured with one or more teeth or other joist engaging device 36. Such device 36 extends into the joist receiving channel 30 and is designed to engage the joist (such as by biting into it) so as to temporarily hold box 10 in place prior to the application of fixture fasteners 24. The ability to temporarily secure box 10 on the overhead joist is preferred so that the installer is not required to himself physically hold box 10 in place while also trying to drive fixture fasteners 24 through mounting holes 26. Joist engaging devices 36 aid the installer by allowing him/her to release their hold on box 10 thereby enabling full attention to be paid to installing fasteners 24.

Of course, other designs for joist engaging device 36 are conceivable such as those types that do not bite or embed themselves into the joist. These types can include those that only snugly or frictionally abut the joist or are adhesively secured to the joist.

In any case, all or a portion of the joist engaging device 36 preferably can be found close or adjacent to the outer perimeter or circumference of the perimetric side wall 16. Ideally, such joist engaging devices 36 do not extend beyond the maximum width of the interior 12 of the box so as to enable the box 10 to be inserted into existing wall or ceiling openings. However, such devices 36 can project beyond such dimension if so desired. It has been found that maximally spacing the engagement teeth 36 in this manner provides the most stable attachment of the box 10 to the joist. Also, the end 34 of the mounting bracket 32 is preferably provided with an angled web portion 37 which projects upwardly from the back wall 14 and supports the engagement device 36 in its outward location.

As mentioned above, the joist engaging device 36 is preferably designed as a tooth so as to readily permit the insertion of a joist therein but not necessarily its ready removal. Thus, the insertion and retention of the joist is preferably accomplished by sloping or chamfering an upper side 38 of the tooth 36 to form an alignment guide on the tooth for inserting the joist into channel 30 while the opposite lower side 40 of device 36 is formed generally at a right angle to the joist, or is angled downwardly toward the back wall 14 to form a stop which resists the removal of the joist from channel 30. The intersection of the sloped upper side 38 and the opposite lower side 40 forms a sharp point or edge 39 adapted to embed or "bite" into a joist.

Removal of the box 10, such as to move the box to another location along the joist or to another joist altogether, is accomplished by prying the devices 36 from the joist with a screwdriver or the like. To facilitate such prying, indents 16b are preferably formed in the perimetric side wall 16 adjacent the engagement teeth 36 to permit access to the teeth with a screwdriver or other tool. More specifically, the perimetric side wall 16 preferably diverts inwardly toward the center of the box 10 at locations adjacent the teeth 36 to provide a clear path to the engagement teeth for a screwdriver or other tool.

FIG. 2 shows multiple openings 26 and 42 in the mid-portion 14a of bottom wall 14 that forms the bottom of joist receiving channel 30. Some such openings are the openings for mounting holes 26 while the other openings 42 are simply the result of molding the upright tabs 22 on the opposite side. As described above, fasteners are intended to pass through the fixture securing openings 26 and not the upright tab openings 42.

One feature that sets this design apart from that already known is the ability to integrate the joist receiving channel with the box itself into a single integral component. Such a design eliminates any subsequent manufacturing step such as the step of attaching additional components to the box once it is formed (other than, perhaps the step of attaching the fixture fasteners 24). Further, the creation of joist engaging devices 36 on channel walls 32 is also formed integral with box 10 and does not require any additional manufacturing step to achieve.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. An electrical outlet box comprising:
   (a) a back wall;
   (b) a perimetric side wall extending from said back wall in a first direction, said back wall and said side wall defining an interior volume;
   (c) at least two mounting brackets extending from said back wall in a second opposite direction, said mounting brackets along with a mid-portion of said back wall defining a joist receiving channel; and
   (d) a joist engaging device provided on each of said mounting brackets, said joist engaging device extending into said joist receiving channel for engaging a joist and temporarily retaining said outlet box thereon, wherein said back wall, said perimetric side wall, said mounting brackets and said joist engaging device are integrally formed and of unitary construction.

2. The outlet box as set forth in claim 1, wherein said back wall is generally planar and wherein said joist receiving channel and said interior volume extend on opposite sides of said back wall.

3. The outlet box as set forth in claim 1, wherein said outlet box is non-metallic.

4. The outlet box as set forth in claim 1, further comprising a screw retention arrangement configured to temporarily secure at least one screw therein.

5. The outlet box as set forth in claim 4, wherein said screw retention arrangement projects into said interior volume.

6. The outlet box as set forth in claim 4, wherein said screw retention arrangement comprises a resilient tab and a fixed post integrally formed on said back wall, said tab and post defining a screw receiving space therebetween.

7. The outlet box as set forth in claim 1, wherein there are two said mounting brackets and wherein said joist engaging device on each of said mounting brackets is configured with at least one tooth for embedment into a respective side of the joist.

8. The outlet box as set forth in claim 7, wherein each of said mounting brackets is provided with two engagement teeth disposed at opposite longitudinal ends thereof.

9. The outlet box as set forth in claim 7, wherein said tooth is configured having a joist receiving side, said joist receiving side being sloped to aid in the insertion of the joist into said joist receiving channel.

10. The outlet box as set forth in claim 9, wherein said tooth further includes a joist retention side opposite said joist receiving side, said joist retention side and said joist receiving side intersecting at a sharp point or edge.

11. The outlet box as set forth in claim 10, wherein said joist retention side extends generally perpendicular to the joist.

12. The outlet box as set forth in claim 10, wherein said joist retention side extends at a downward angle toward said back wall of said box.

13. The outlet box as set forth in claim 7, wherein said joist engaging device does not project outwardly beyond a maximum width of said box interior volume.

14. The outlet box as set forth in claim 7, wherein said perimetric side wall includes indents formed adjacent said joist engaging device for permitting access to said joist engaging device with a tool.

* * * * *